(12) United States Patent
Lawrence et al.

(10) Patent No.: US 9,590,402 B2
(45) Date of Patent: Mar. 7, 2017

(54) UNIVERSAL MOUNTING CLIP FOR SIGNAL-CARRYING CABLES

(71) Applicant: PPC Broadband, Inc., East Syracuse, NY (US)

(72) Inventors: Michael E. Lawrence, Syracuse, NY (US); Brian K. Hanson, Cicero, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 14/853,758

(22) Filed: Sep. 14, 2015

(65) Prior Publication Data

US 2016/0076671 A1    Mar. 17, 2016

Related U.S. Application Data

(60) Provisional application No. 62/049,460, filed on Sep. 12, 2014.

(51) Int. Cl.
*G09F 3/00* (2006.01)
*H02G 3/32* (2006.01)

(52) U.S. Cl.
CPC .................................. *H02G 3/32* (2013.01)

(58) Field of Classification Search
USPC ............ 248/65, 71, 74.1, 74.2; 24/545, 563
See application file for complete search history.

(56) References Cited

U.S. PATENT DOCUMENTS

| 2,893,671 | A |   | 7/1959 | Flora et al. |
| 3,216,685 | A |   | 11/1965 | Raymond |
| 3,444,596 | A |   | 5/1969 | Soltysik |
| 3,584,348 | A | * | 6/1971 | Soltysik ................. F16L 3/237 248/68.1 |
| 5,752,681 | A | * | 5/1998 | Janssen .................... F16L 3/04 248/65 |
| 6,561,465 | B2 | * | 5/2003 | Kondo .................. F16L 3/1025 174/135 |

(Continued)

OTHER PUBLICATIONS

Jan. 15, 2016 Search Report issued in International Application No. PCT/US2015/050019.

*Primary Examiner* — Steve Marsh
(74) *Attorney, Agent, or Firm* — Oliff PLC

(57) ABSTRACT

A mounting clip for retaining a cable against a mounting surface includes a mounting flange configured to be mounted to a mounting structure, a first cable retainer, and a second cable retainer. The first cable retainer extends from the mounting flange and defines a first passage configured to receive a length of a cable therethrough. The second cable retainer extends from the mounting flange and defines a second passage configured to receive the length of cable therethrough. The second cable retainer is resiliently movable between a rest position and a loaded position. In the rest position, the second cable retainer extends into the first passage and defines the second passage smaller than the first passage. In the loaded position, the second cable retainer is moved in a direction away from the mounting structure by the length of the cable received in the first passage and is configured to apply a force to an outer surface of the length of the cable to hold the length of the cable against the mounting structure.

20 Claims, 4 Drawing Sheets

(56) References Cited

U.S. PATENT DOCUMENTS

| | | | |
|---|---|---|---|
| 7,856,746 B1* | 12/2010 | Araujo | A61M 5/1418 24/487 |
| 8,079,552 B2* | 12/2011 | Sweigard | F16L 3/1233 24/336 |
| 2006/0130290 A1 | 6/2006 | Yi | |
| 2012/0012716 A1* | 1/2012 | Lien | F16B 5/0685 248/74.2 |
| 2014/0151514 A1* | 6/2014 | Asai | B60R 16/0215 248/74.1 |

* cited by examiner

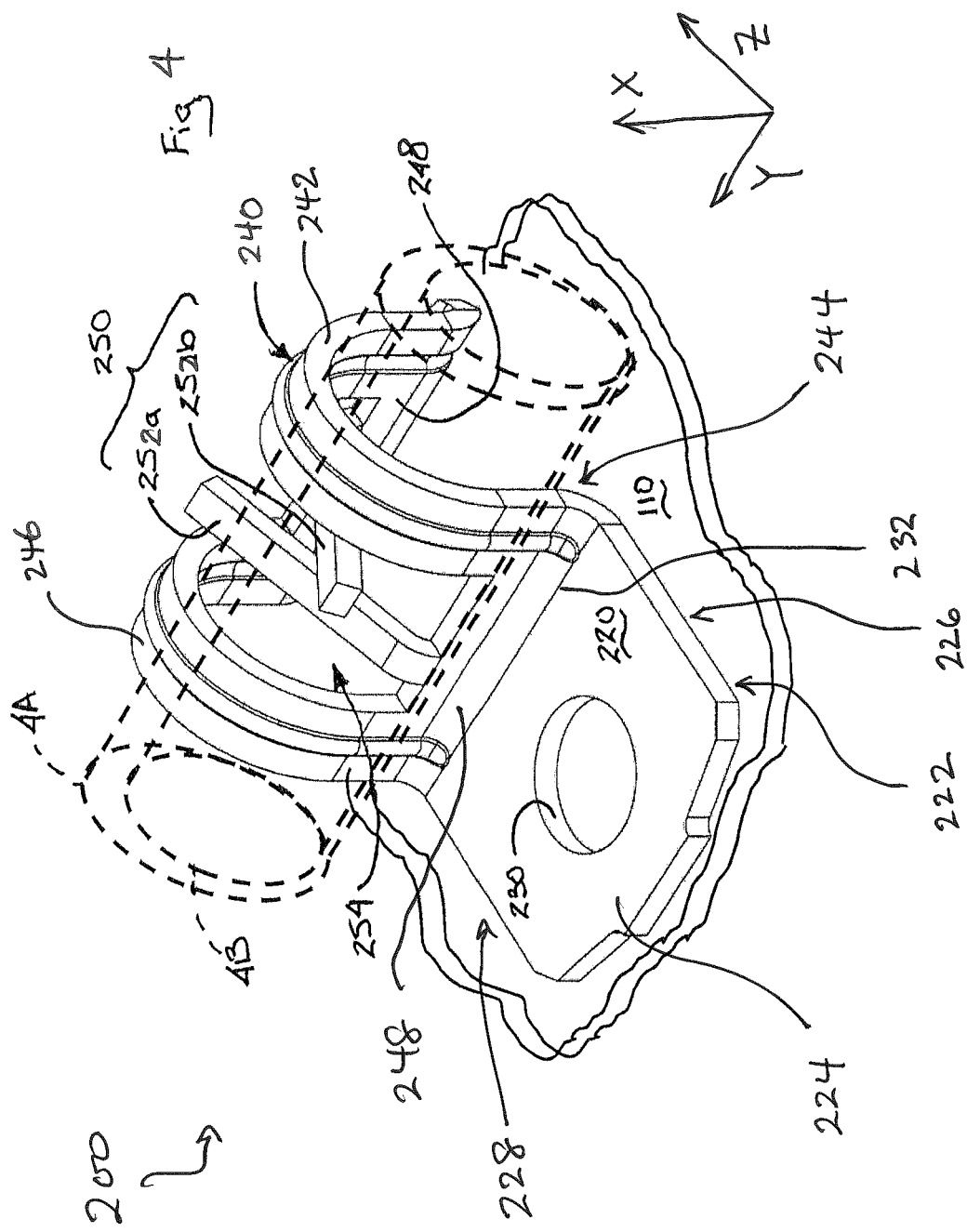

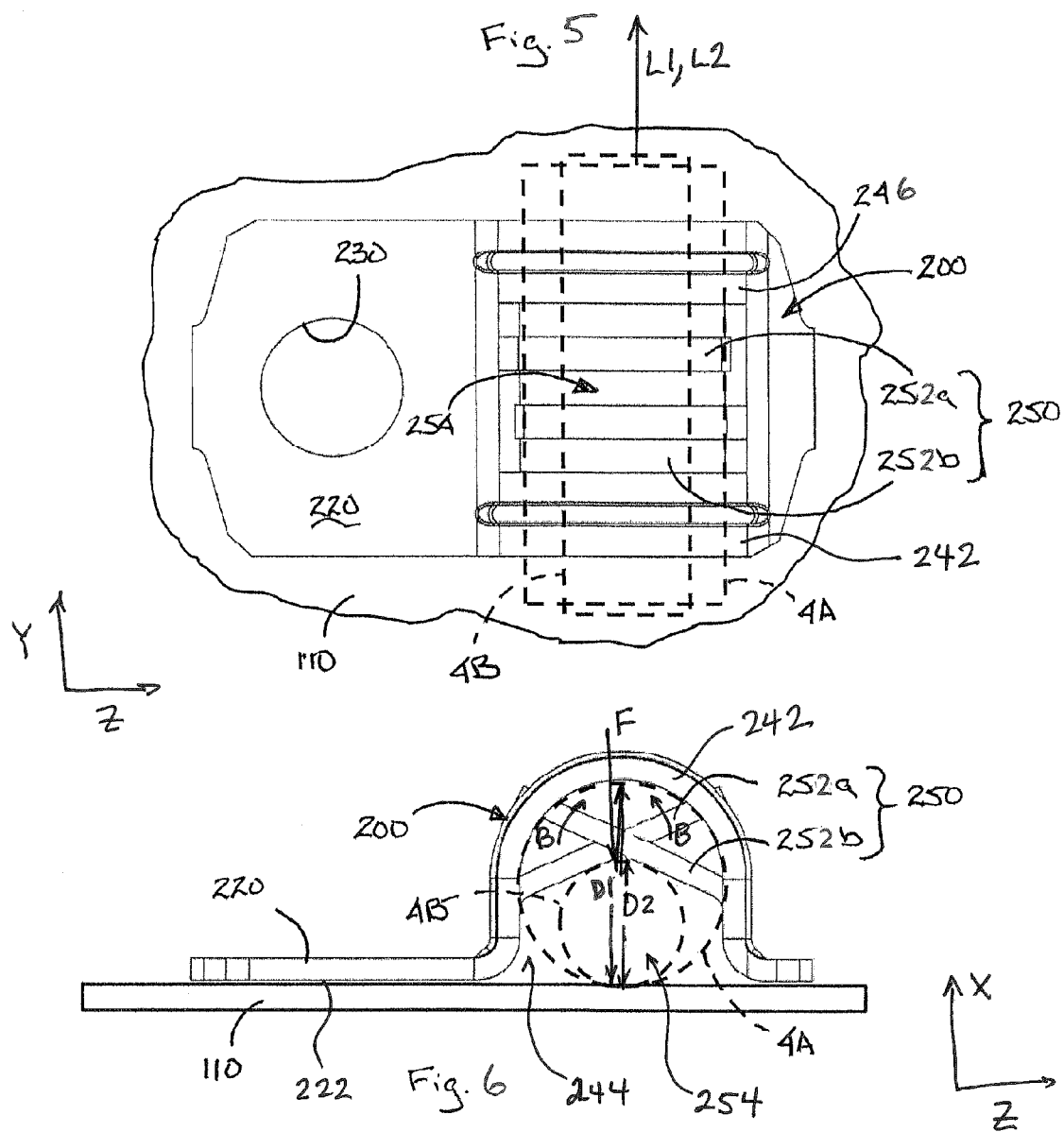

UNIVERSAL MOUNTING CLIP FOR SIGNAL-CARRYING CABLES

CROSS-REFERENCE TO RELATED APPLICATION

This application is a non-provisional application that claims the benefits of priority of U.S. Provisional Application No. 62/049,460, filed on Sep. 12, 2014, the disclosure of which is incorporated herein by reference in its entirety.

BACKGROUND

Technical Field

The present disclosure relates generally to mounting clips and, more particularly, mounting clips that attach cables, such as electrical wires, coaxial cables, fiber optic cables, and the like, to a mounting surface, such as a floor, wall, or ceiling, using a mechanical fastener. The mounting clips of this disclosure are "universal" clips that can secure cables of various sizes against a variety of surfaces.

Background

Wire cables carry audio and/or video signals for radios, televisions, and telecommunications devices. Such signals are carried using, for example, Coaxial (Coax), High Definition Multimedia Interface (HDMI), Digital Video Interface (DGI), Video Graphics Array/Adapter (VGA), and Separation Video (S-Video) cables.

A signal carrying cable generally refers to a collection of two or more wires or conductors including a "hot" line to carry the current/signal, a "neutral" line to complete the signal carrying loop, and a "ground" line. Classified according to the number of wires and gauge, cables are marked by a series of letters followed by a number, a dash and another number. The letters indicate the type of insulation, the subsequent number indicates the resistance of the wires in the cable, and the final number following the dash indicates the number of individual conductors in the cable. If a designator "G" is found in the series, it means that the cable is equipped with a non-current-carrying ground wire.

TABLE A below defines the size of the outer diameter in both inches (in) and millimeters (mm) for certain exemplary types of Coaxial (Coax) cables. To achieve the desired electrical properties, the outer diameter of the jacket is also a function of the core dielectric and core diameter.

TABLE A

| Coax Cable | impedance (ohms) | Core | OD (in) | OD (mm) |
|---|---|---|---|---|
| RG-6/U | 75 | 1.0 mm | 0.270 | 6.86 |
| RG-6/UQ | 75 | 1.15 mm | 0.298 | 7.57 |
| RG-7 | 75 | 1.30 mm | 0.320 | 8.13 |
| RG-8/U | 50 | 2.17 mm | 0.405 | 10.3 |
| RG-8X | 50 | 1.0 mm | 0.242 | 6.1 |
| RG-9/U | 51 | 1.58 mm | 0.420 | 10.7 |
| RG-11/U | 75 | 1.63 mm | 0.412 | 10.5 |
| RG-56/U | 48 | 1.4859 mm | 0.308 | 7.82 |
| RG-58/U | 50 | 0.81 mm | 0.195 | 5.0 |
| RG-59/U | 75 | 0.64 mm | 0.242 | 6.1 |
| RG-59A/U | 75 | 0.762 mm | 0.242 | 6.1 |
| 3C-2V | 75 | 0.50 mm | 0.211 | 5.4 |
| 5C-2V | 75 | 0.80 mm | 0.256 | 6.5 |
| RG-60/U | 50 | 1.024 mm | 0.425 | 10.8 |
| RG-62/U | 92 | 1.024 mm | 0.242 | 6.1 |
| RG-62A | 93 | 1.024 mm | 0.242 | 6.1 |
| RG-63 | 125 | 1.2 mm | 0.405 | 10.29 |
| RG-142/U | 50 | 0.94 mm | 0.195 | 4.95 |
| RG-174/U | 50 | 7 × 0.16 mm | 0.100 | 2.55 |
| RG-178/U | 50 | 7 × 0.1 mm | 0.071 | 1.8 |
| RG-179/U | 75 | 7 × 0.1 mm | 0.098 | 2.5 |
| RG-180B/U | 95 | 0.0120 in | 0.145 | 3.68 |
| RG-188A/U | 50 | 7 × 0.16 mm | 0.1 | 2.54 |
| RG-213/U | 50 | 7 × 0.0296 in Cu | 0.405 | 10.3 |
| RG-214/U | 50 | 7 × 0.0296 in | 0.425 | 10.8 |
| RG-218 | 50 | 0.195 in Cu | 0.870 | 22 |
| RG-223/U | 50 | 0.88 mm | 0.212 | 5.4 |
| RG-316/U | 50 | 7 × 0.0067 in | 0.098 | 2.6 |
| RG-400/U | 50 | 19 × 0.20 mm | | 4.95 |
| RG-402/U | 50 | 0.93 mm | 0.1409 | 3.58 |
| RG-405/U | 50 | 0.51 mm | 0.0865 | 2.20 |
| H155 | 50 | 19 × 0.28 mm | 0.205 | 5.4 |
| LMR-195 | 50 | 1.12 mm Cu | 0.195 | 4.95 |
| LMR-200 | 50 | 1.12 mm Cu | 0.195 | 4.95 |
| LMR-240 | 50 | 1.42 mm Cu | 0.240 | 6.1 |
| LMR-400 | 50 | 2.74 mm (Cu-clad Al) | 0.405 | 10.29 |
| LMR-600 | 50 | 4.47 mm (Cu-clad Al) | 0.590 | 14.99 |
| LMR-900 | 50 | 6.65 mm (BC tube) | 0.870 | 22.10 |
| LMR-1200 | 50 | 8.86 mm (BC tube) | 1.200 | 30.48 |
| LMR-1700 | 50 | 13.39 mm (BC tube) | 1.670 | 42.42 |

In view of the number and variety of cables, it will be appreciated that mounting such cables to and/or alongside towers and/or building structures requires a significant number and variety of mounting clips or other mounting devices. Consequently, an operator/technician must carry, in inventory, a large number of suitable mounting clips and be skilled in the selection and use thereof to secure cables to a corresponding support structure. The need to maintain such inventory mounting clips and time required to select/install a correct mounting clip (taking into consideration the time to rework an improperly installed clip) is fiscally burdensome for a service provider.

Therefore, in the world of cable installers, it may be desirable to provide a cable clip that can fit several sizes of cable and effectively secure different sizes of cable to a variety of surfaces. It may be desirable to provide a mounting clip that can grip to the cable itself while the installer secures the mounting clip to the surface to which the cable is to be mounted by, for example, driving a fastener through the mounting clip and into the surface.

SUMMARY

In accordance with various aspects of the disclosure, a mounting clip for retaining a cable against a mounting surface includes a mounting flange configured to be mounted to a mounting structure, a first cable retainer, and a second cable retainer. The first cable retainer extends from the mounting flange and defines a first passage configured to receive a length of a cable therethrough. The second cable retainer extends from the mounting flange and defines a second passage configured to receive the length of cable therethrough. The second cable retainer is resiliently movable between a rest position and a loaded position. In the rest position, the second cable retainer extends into the first passage and defines the second passage smaller than the first passage. In the loaded position, the second cable retainer is moved in a direction away from the mounting structure by the length of the cable received in the first passage and is configured to apply a force to an outer surface of the length of the cable to hold the length of the cable against the mounting structure.

According to various aspects of the disclosure, a mounting clip for retaining a cable against a mounting surface includes a mounting flange configured to be mounted to a mounting structure, a cable retainer, and a cantilever spring. The cable retainer extends from the mounting flange and defines a first passage configured to receive a length of a cable therethrough. The cantilever spring extends from the mounting flange into the first passage in a rest position to define a second passage configured to receive the length of cable therethrough. The second passage is smaller than the first passage. The cantilever spring is resiliently movable between the rest position and a loaded position in a direction away from the mounting structure relative to the rest position. The cantilever spring is configured, in the loaded position, to apply a force to an outer surface of the length of the cable received in the first passage to hold the length of the cable against the mounting structure.

BRIEF DESCRIPTION OF THE DRAWINGS

Features and advantages of the present disclosure are described in, and will be apparent from, the following Brief Description of the Drawings and Detailed Description.

FIG. 4 is an isometric, broken-away, view of an exemplary mounting clip according to another embodiment of the present disclosure.

FIG. 5 is a top view of the mounting clip illustrated in FIG. 4.

FIG. 6 is a profile view of the mounting clip illustrated in FIG. 5.

DETAILED DESCRIPTION

Figure 1:
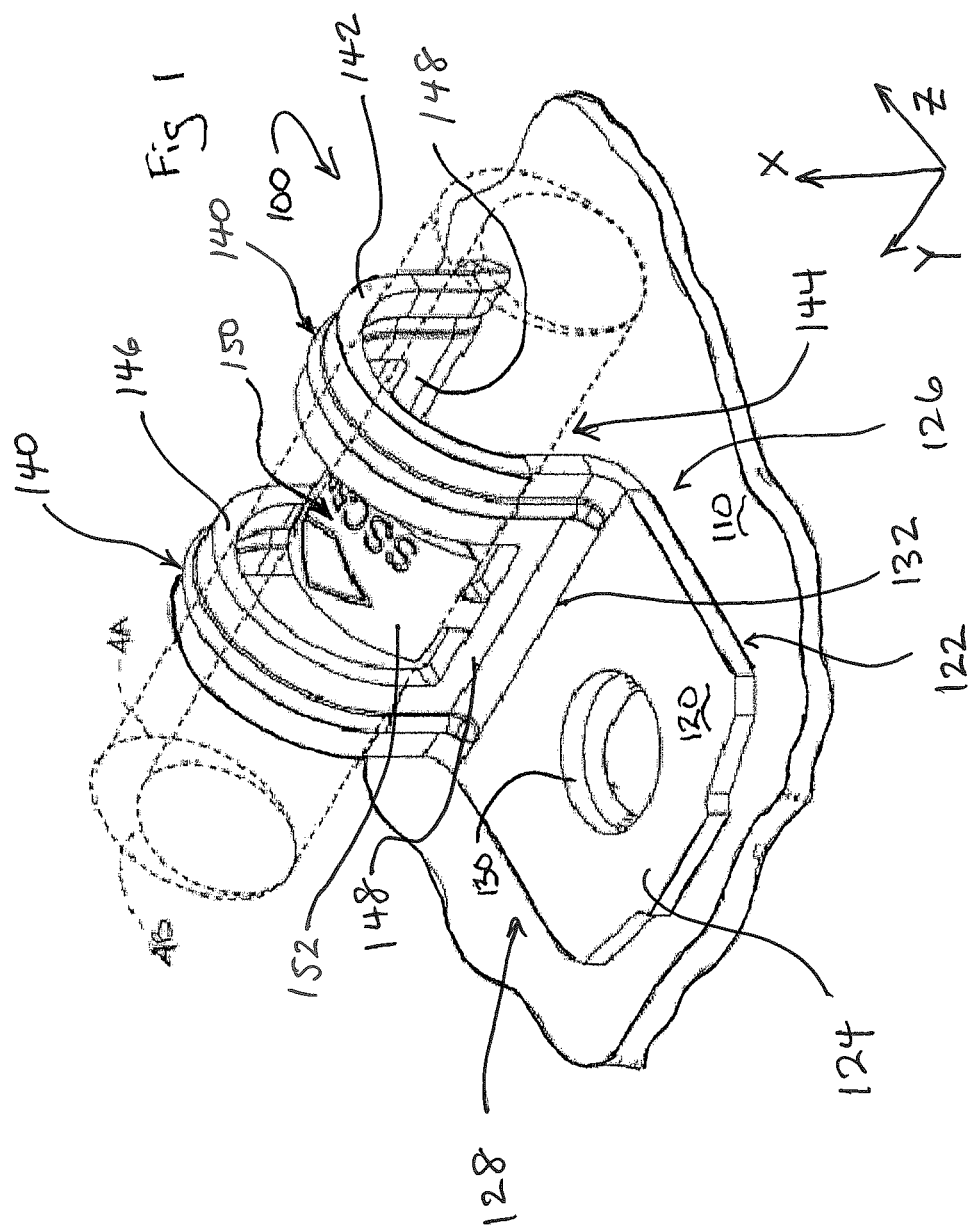
FIG. 1 is an isometric, broken-away, view of an exemplary mounting clip according to an embodiment of the present disclosure.
Figure 2:
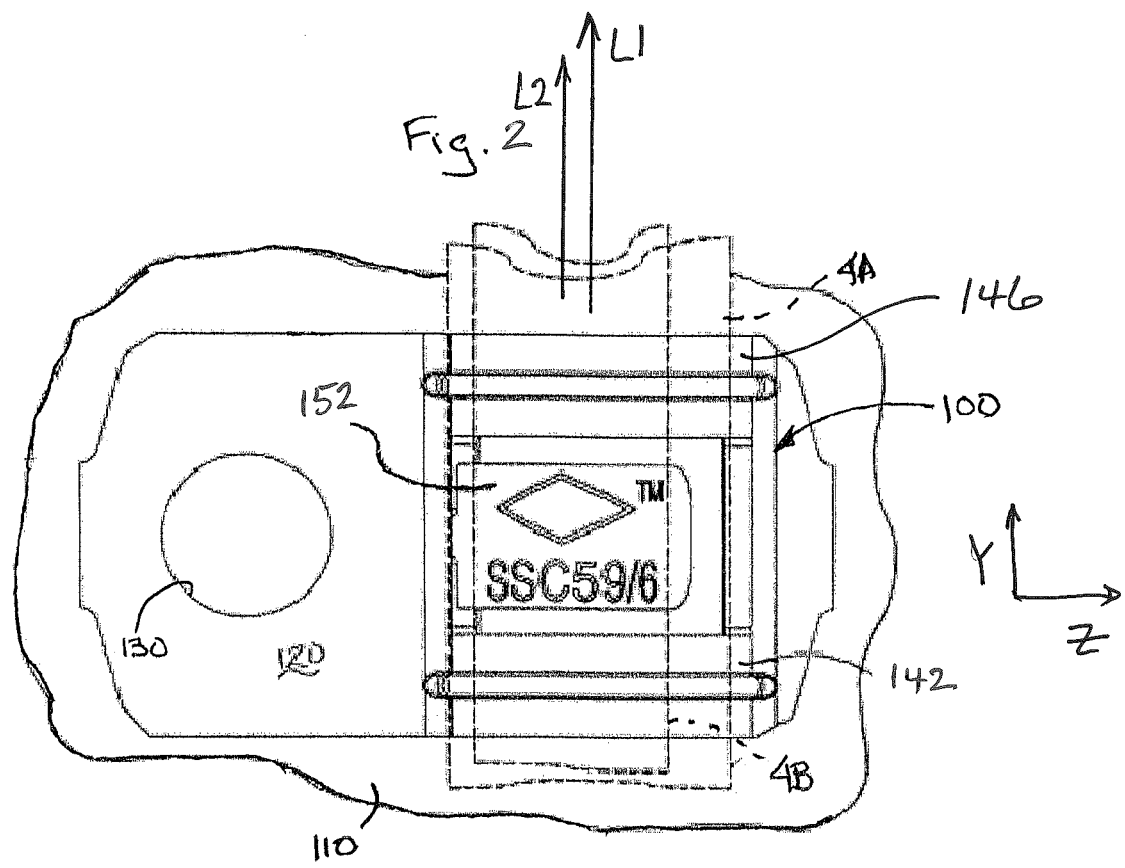
FIG. 2 is a top view of the mounting clip illustrated in FIG. 1.
Figure 3:
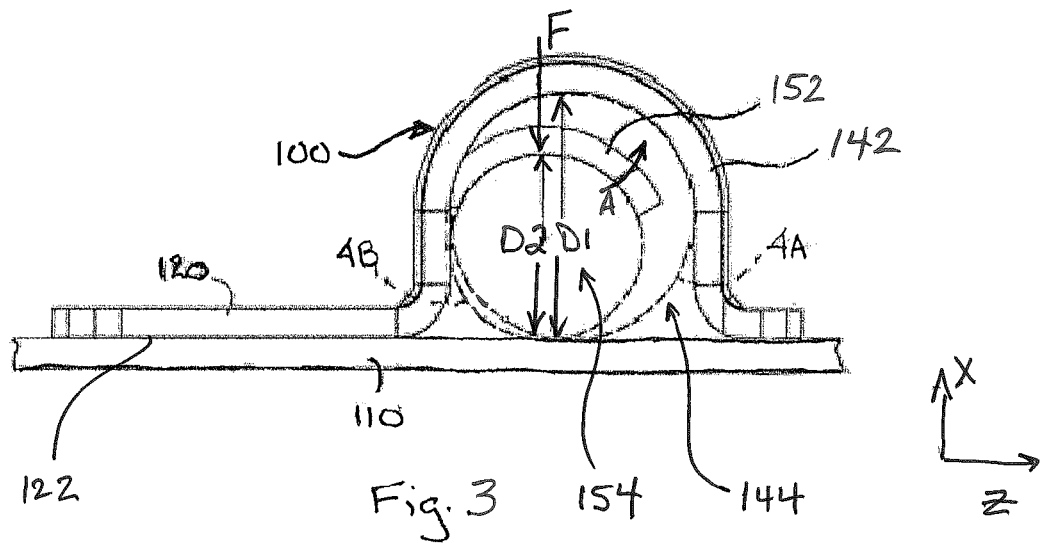
FIG. 3 is a profile view of the mounting clip illustrated in FIG. 2.

FIGS. 1-3 illustrate an exemplary mounting clip 100 according to an embodiment of the disclosure. The mounting clip 100 is configured to affix one of a plurality of coaxial cables 4A, 4B, (the cables having a different diameter dimensions) to a mounting structure 110. More specifically, the mounting clip 100 comprises a mounting flange 120, a first cable retainer 140, and a second cable retainer 150.

The mounting flange 120 is configured to be fastened to the mounting structure 110. For example, the mounting flange 120 may include a first surface 122 that faces the mounting structure 110 when the mounting clip 100 is fastened to the mounting structure 110, and a second surface 124 that faces in a first direction X away from the mounting structure 110. The first and second surfaces 122, 124 extend in a second direction Y from a first end 126 of the mounting flange 120 to an opposite second end 128. The second direction is perpendicular to the first direction.

According to various aspects, the mounting flange 120 may include an aperture 130 for receiving a fastener, for example, a mechanical fastener (not shown), operative to couple the mounting flange 120 to the mounting structure 110. The mounting flange 120 also includes a side 132 extending from the first end 126 to the second end in the second direction Y. The first cable retainer 140 and the second cable retainer 150 extend from the side 132 of the mounting flange 120, as will be described in more detail below.

The first cable retainer 140 extends from the side 132 of the mounting flange 120 in the first direction X and in a third direction Z away from the mounting flange 120. The third direction Z is orthogonal to the first and second directions X, Y. The first cable retainer 140 includes a curved wall 142 that defines a passage 144 for receiving a cable 4A, 4B having a longitudinal axis L1, L2 extending in the second direction Y. The passage 144 has a dimension D1 in the first direction X selected to receive a cable 4A having a similar dimension in a cross-section transverse to the longitudinal axis L1. Of course, the passage 144 can receive any cable having a cross-sectional dimension less than the dimension D1.

It some aspects, the first cable retainer 140 may include a second curved wall 146 similar to the curved wall 142, but spaced apart from the curved wall 142 in the second direction Y. The second curved wall 146 cooperates with the curved wall 142 to define the passage 144 for receiving the cable 4A. It should be appreciated that the mounting clip 100 may have more than two curved walls spaced apart in the second direction Y. In some aspects, the first cable retainer 140 may include base walls 148 for joining the two or more curved walls 142, 146.

The second cable retainer 150 also extends away from the side 132 of the mounting flange 120 in the first direction X and the third direction Z. The second cable retainer 150 is configured as a cantilever spring 152 having a rest position as best illustrated in FIGS. 1 and 3. In its rest position, the second cable retainer 150 defines a passage 154 having a smaller dimension D2 in the first direction X than the dimension D1 of the passage 144 defined by the first cable retainer 140. Referring to FIG. 3, in its rest position, the second cable retainer 150 can receive a cable 4B having a dimension similar to D2 in a cross-section transverse to the longitudinal axis L2.

The cantilever spring 152 of the second cable retainer 150 can also be resiliently urged outward from its rest position, as indicated by arrow A in FIG. 3, to receive a cable having a cross-sectional dimension greater than D2 and as large as the dimension D1 of the first passage 144. Thus, when receiving a cable having a cross-sectional dimension from D1 to D2, the spring force of the cantilever spring 152 of the second cable retainer 150 applies a biasing force F to the cable, thereby forcibly holding the cable against the mounting structure 110 and preventing movement of cable relative to the mounting clip 100. Of course, the passage 154 can receive any cable having a cross-sectional dimension less than the dimension D2, but neither the first cable retainer 140 nor the second cable retainer 150 will forcibly hold the cable against the mounting structure 110 and, thus, the cable will be free to move within the passages 144, 154 of the mounting clip 100. It should be understood that if the mounting clip is used to hold a cable having a cross-sectional dimension greater than the dimension D1 of the first passage, the first cable retainer will apply an additional force to hold the cable against the mounting structure 110.

In some aspects of the disclosure, the first cable retainer 140 and/or the second cable retainer 150 may be arcuate shaped to substantially conform to the shape and size of a cylindrical outer wire/coaxial cable. However, it should be appreciated that the first and second cable retainers 140, 150 may have any shape that can cooperate with the mounting flange 120 to hold a cable against the mounting structure 110. In some aspects, the first cable retainer 140, the second cable retainer 150, and the mounting flange 120 of the mounting clip 100 may be integrally formed as a single monolithic (i.e., one-piece) structure. The mounting clip 100 may be formed, for example, from plastic, aluminum, steel, or any other material that can provide a relatively rigid first cable retainer 140 and mounting flange 120 while providing a second cable retainer 150 configured as a cantilever spring 152. It should be appreciated that a plurality of first and second cable retainers 140, 150 may be used in series, or in parallel, to engage and secure cables of various sizes and shapes.

Referring now to FIGS. 12-14, another embodiment of a mounting clip 200 is provided for affixing one of a plurality of coaxial cables 4A, 4B, (the cables having a different diameter dimensions) to a mounting structure 110. The mounting clip 200 comprises a mounting flange 220, a first cable retainer 240, and a second cable retainer 250.

The mounting flange 220 is configured to be fastened to the mounting structure 210. For example, the mounting flange 220 may include a first surface 222 that faces the mounting structure 210 when the mounting clip 200 is fastened to the mounting structure 210, and a second surface 224 that faces in a first direction X away from the mounting structure 210. The first and second surfaces 222, 224 extend in a second direction Y from a first end 226 of the mounting flange 220 to an opposite second end 228. The second direction is perpendicular to the first direction.

According to various aspects, the mounting flange 220 may include an aperture 130 for receiving a fastener, for example, a mechanical fastener (not shown), operative to couple the mounting flange 220 to the mounting structure 210. The mounting flange 220 also includes a side 232 extending from the first end 226 to the second end in the second direction Y. The first cable retainer 240 and the second cable retainer 250 extend from the side 232 of the mounting flange 220, as will be described in more detail below.

The first cable retainer 240 extends from the side 232 of the mounting flange 220 in the first direction X and in a third direction Z away from the mounting flange 220. The third direction Z is orthogonal to the first and second directions X, Y. The first cable retainer 240 includes a curved wall 242 that defines a passage 244 for receiving a cable 4A, 4B having a longitudinal axis L1, L2 extending in the second direction Y. The passage 244 has a dimension D1 in the first direction X selected to receive a cable 4A having a similar dimension in a cross-section transverse to the longitudinal axis L1. Of course, the passage 244 can receive any cable having a cross-sectional dimension less than the dimension D1.

It some aspects, the first cable retainer 240 may include a second curved wall 246 similar to the curved wall 242, but spaced apart from the curved wall 242 in the second direction Y. The second curved wall 246 cooperates with the curved wall 242 to define the passage 244 for receiving the cable 4A. It should be appreciated that the mounting clip 200 may have more than two curved walls spaced apart in the second direction Y. In some aspects, the first cable retainer 240 may include base walls 248 for joining the two or more curved walls 242, 246.

The second cable retainer 250 includes a pair of linear cantilever springs 252a, 252b projecting into the passage 144 and forming a V-shaped or X-shaped retainer to engage the outer cylindrical surface of a cable. For example, a first one 252a of the cantilever springs extends away from the side 232 of the mounting flange 220 in the first direction X and the third direction Z, while the second one 252b of the cantilever springs extends from a base wall toward the side 232 of the mounting flange 220 in the first direction X and the third direction Z. The cantilever springs 252a, 252b have a rest position as best illustrated in FIGS. 4 and 6. In their rest position, the cantilever springs 252a, 252b define a passage 254 having a smaller dimension D2 in the first direction X than the dimension D1 of the passage 244 defined by the first cable retainer 240. Referring to FIG. 6, in their rest position, the cantilever springs 252a, 252b can receive a cable 4B having a dimension similar to D2 in a cross-section transverse to the longitudinal axis L2.

The cantilever springs 252a, 252b of the second cable retainer 250 can also be resiliently urged outward from their rest position, as indicated by arrows B in FIG. 6, to receive a cable having a cross-sectional dimension greater than D2 and as large as the dimension D1 of the first passage 244. Thus, when receiving a cable having a cross-sectional dimension from D1 to D2, the spring forces of the cantilever springs 252a, 252b of the second cable retainer 250 apply a biasing force F to the cable, thereby forcibly holding the cable against the mounting structure 210 and preventing movement of cable relative to the mounting clip 200. Of course, the passage 254 can receive any cable having a cross-sectional dimension less than the dimension D2, but neither the first cable retainer 240 nor the second cable retainer 250 will forcibly hold the cable against the mounting structure 210 and, thus, the cable will be free to move within the passages 244, 254 of the mounting clip 200. It should be understood that if the mounting clip is used to hold a cable having a cross-sectional dimension greater than the dimension D1 of the first passage, the first cable retainer will apply an additional force to hold the cable against the mounting structure 210.

In some aspects of the disclosure, the first cable retainer 240 and/or the second cable retainer 250 may be non-linear. However, it should be appreciated that the first and second cable retainers 240, 250 may have any shape that can cooperate with the mounting flange 220 to hold a cable against the mounting structure 210. In some aspects, the first cable retainer 240, the second cable retainer 250 (including cantilever springs 252a, 252b), and the mounting flange 220 of the mounting clip 200 may be integrally formed as a single monolithic (i.e., one-piece) structure. The mounting clip 200 may be formed, for example, from plastic, aluminum, steel, or any other material that can provide a relatively rigid first cable retainer 240 and mounting flange 220 while providing a second cable retainer 250 configured as cantilever springs 252a, 252b. It should be appreciated that a plurality of first and second cable retainers 240, 250 may be used in series, or in parallel, to engage and secure cables of various sizes and shapes.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A mounting clip for retaining a cable against a mounting surface, the mounting clip comprising:
   a planar mounting flange configured to be mounted to a mounting structure, the planar mounting flange having a first end and a second opposite end in a first direction and a third end and an opposite fourth end in a second direction, the second direction being perpendicular to the first direction;
   a first cable retainer extending from the planar mounting flange and defining a first passage configured to receive a length of a cable therethrough, the first cable retainer including:
      a first base wall extending from the second end of the planar mounting flange in a third direction that is perpendicular to the first direction and the second direction,
      a second base wall extending parallel to the first base wall in the third direction, and
      a curved wall connecting the first base wall and the second base wall, the curved wall having a semicircular cross-section in a plane that extends in the first direction; and
   a second cable retainer extending from the first base wall of the planar mounting flange, the second cable retainer defining a second passage configured to receive the length of cable therethrough, the second cable retainer being resiliently movable between a rest position and a loaded position, the second cable retainer (i) in the rest position, extending into the first passage and defining the second passage smaller than the first passage, and (ii) in the loaded position, being moved in a direction away from the mounting structure by the length of the cable received in the first passage and being configured to apply a force to an outer surface of the length of the cable to hold the length of the cable against the mounting structure, wherein
   the second base wall is spaced from the first base wall by a first distance when the first base wall, the curved wall, and the second base wall are in a rest configuration,
   the curved wall has a semicircular cross-section in a plane that extends in the first direction, the semicircular cross-section having a diameter equal to the first distance when the first base wall, the curved wall, and the second base wall are in the rest configuration,
   when a first side of the planar mounting flange is placed against the mounting structure for mounting thereto, the curved wall is configured to cooperate with the mounting structure to delimit the first passage together with the first base wall and the second base wall, and
   when a first side of the planar mounting flange is placed against the mounting structure for mounting thereto, a maximum distance from the mounting structure to a surface of the curved wall in the third direction is equal to the first distance when the first base wall, the curved wall, and the second base wall are in the rest configuration.

2. The mounting clip of claim 1, wherein the second cable retainer comprises a cantilever spring.

3. The mounting clip of claim 2, wherein the cantilever spring is arcuate.

4. The mounting clip of claim 2, wherein the cantilever spring is linear.

5. The mounting clip of claim 1, wherein the length of the cable has a cross-sectional dimension transverse to a longitudinal axis of the length of the cable, the cross-sectional dimension being greater than a dimension of the second passage.

6. The mounting clip of claim 1, wherein the second cable retainer comprises a pair of cantilever springs extending toward one another from opposite sides of the first passage.

7. The mounting clip of claim 6, wherein the pair of cantilever springs are linear.

8. The mounting clip of claim 6, wherein the pair of cantilever springs are arcuate.

9. The mounting clip of claim 1, wherein the first cable retainer comprises a second curved wall connecting the first base wall and the second base wall, the second carved wall being spaced from the curved wall in the second direction, the second curved wall being configured to define the first passage in cooperation with the mounting structure.

10. A mounting clip for retaining a cable against a mounting surface, the mounting clip comprising:
   a planar mounting flange configured to be mounted to a mounting structure, the planar mounting flange having a first end and a second opposite end in a first direction and a third end and an opposite fourth end in a second direction the second direction being perpendicular to the first direction;
   a cable retainer extending from the planar mounting flange and defining a first passage configured to receive a length of a cable therethrough, the first cable retainer including:
      a first base wail extending from the second end of the planar mounting flange in a third direction that is perpendicular to the first direction and the second direction,
      a second base wall extending parallel to the first base wall in the third direction, and
      a curved wall connecting the first base wall and the second base wall, the curved wall having a semicircular cross-section in a plane that extends in the first direction; and
   a cantilever spring extending from the first base wall of the planar mounting flange into the first passage in a rest position to define a second passage configured to receive the length of cable therethrough, the second passage being smaller than the first passage, the cantilever spring being resiliently movable between the rest position and a loaded position in a direction away from the mounting structure relative to the rest position, the cantilever spring being configured, in the loaded position, to apply a force to an outer surface of the length of the cable received in the first passage to hold the length of the cable against the mounting structure, wherein
   the second base wall is spaced from the first base wall by a first distance when the first base wall, the curved wall, and the second base wail are in a rest configuration,
   the curved wall has a semicircular cross-section in a plane that extends in the first direction, the semicircular cross-section having a diameter equal to the first distance when the first base wall, the curved wall, and the second base wall are in the rest configuration, when a first side of the planar mounting flange is placed against the mounting structure for mounting thereto, the curved wall is configured to cooperate with the mounting structure to delimit the first passage together with the first base wall and the second base wall, and when a first side of the planar mounting flange is placed against the mounting structure for mounting thereto, a maximum distance from the mounting structure to a surface of the curved wall in the third direction is equal to the first distance when the first base wall, the curved wall, and the second base wall are in the rest configuration.

11. The mounting clip of claim 10, wherein the cantilever spring is linear.

12. The mounting clip of claim 10, wherein the cantilever spring is arcuate.

13. The mounting clip of claim 10, wherein the length of the cable has a cross-sectional dimension transverse to a longitudinal axis of the length of the cable, the cross-sectional dimension being greater than a dimension of the second passage.

14. The mounting clip of claim 10, wherein the second cable retainer comprises a second cantilever spring, the cantilever spring and the second cantilever spring extending toward one another from opposite sides of the first passage.

15. The mounting clip of claim 14, wherein the cantilever spring and the second cantilever spring are linear.

16. The mounting clip of claim 15, wherein the cantilever spring and the second cantilever spring cooperate to define a V-shaped or X-shaped cable retainer.

17. The mounting clip of claim 14, wherein the cantilever spring and the second cantilever spring are arcuate.

18. The mounting clip of claim 10, wherein the cable retainer comprises a second curved wall connecting the first base wall and the second base wall, the second curved wad being spaced from the curved wall in the second direction, the second curved wall being configured to define the first passage in cooperation with the mounting structure.

19. The mounting clip of claim 14, wherein the cantilever spring extends from the first base wall, and the second cantilever spring extends from the second base wall.

20. The mounting clip of claim 6, wherein a first one of the pair of cantilever springs extends from the first base wall, and a second one of the pair of cantilever springs extends from the second base wall.

* * * * *